United States Patent [19]

Becker et al.

[11] 4,326,230

[45] Apr. 20, 1982

[54] CIRCUIT FOR MONITORING THE VOLTAGE STRESS OF A CAPACITOR

[75] Inventors: Michael Becker, Uttenreuth; Klaus Renz, Fürth; Manfred Weibelzahl, Weiher; Alfons Fendt, Erlangen; Dusan Povh, Nuremberg; Gerhard Schuch, Erlangen; Hermann Waldmann, Weiher, all of Fed. Rep. of Germany

[73] Assignee: Siemens Aktiengesellschaft, Munich, Fed. Rep. of Germany

[21] Appl. No.: 165,809

[22] Filed: Jul. 3, 1980

[30] Foreign Application Priority Data

Jul. 19, 1979 [DE] Fed. Rep. of Germany ....... 2929272

[51] Int. Cl.³ .............................................. H02H 7/16
[52] U.S. Cl. ........................................ 361/17; 361/15; 361/86; 361/89
[58] Field of Search ....................... 361/17, 16, 15, 87, 361/86, 88, 89, 90, 91, 110, 111; 324/126, 60 R, 60 C, 111; 307/149

[56] References Cited

U.S. PATENT DOCUMENTS 3,870,927  3/1975  Hughes ................................. 361/16
4,104,687  8/1978  Zulaski ............................... 361/15 X Primary Examiner—Patrick R. Salce
Attorney, Agent, or Firm—Kenyon & Kenyon

[57] ABSTRACT

A circuit for monitoring the voltage stress of a capacitor which produces an over-stress indicator signal responsive to the over-voltage history of the capacitor. If the measured voltage stress of the capacitor exceeds a predetermined over-voltage value, a characteristic-curve generator, having a predetermined transfer function, produces an output signal which is responsive to the measured voltage stress of the capacitor and the transfer function of the characteristic-curve generator. This signal is combined with a further signal which is responsive to a predetermined permissible continuous operation voltage value. The combined signals are conducted to an integrator having a predetermined integration time constant for producing an overload signal. The overload signal at the output of the integrator is a measure of the state of stress of the capacitor. Circuitry may be provided for disconnecting the capacitor from a transmission line in response to the output signal of the integrator. Also, plural capacitor voltage stress monitoring stages may be combined to monitor the capacitor voltage stress in a plurality of over-voltage ranges.

4 Claims, 1 Drawing Figure

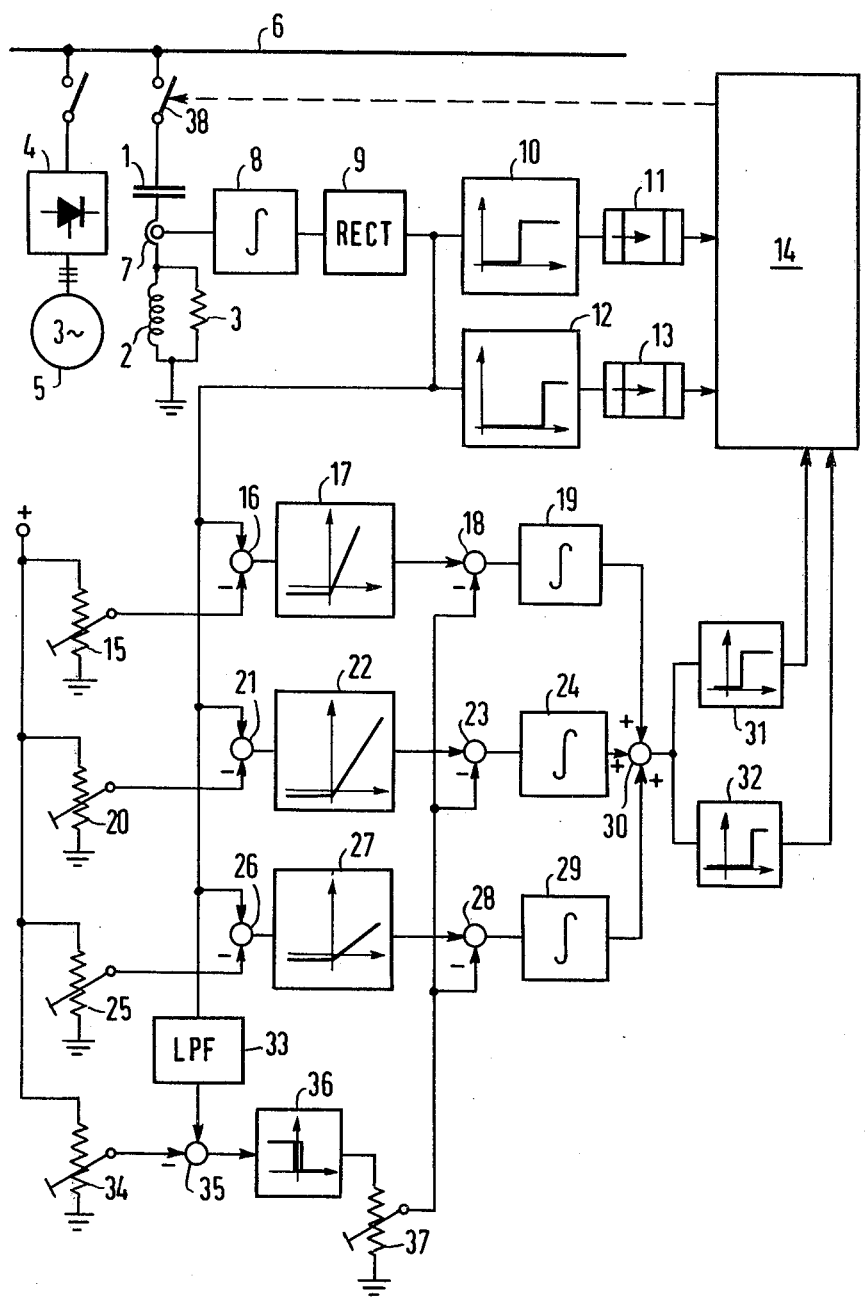

CIRCUIT FOR MONITORING THE VOLTAGE STRESS OF A CAPACITOR

BACKGROUND OF THE INVENTION

This invention relates generally to circuits which monitor the voltage stress in a capacitor, and more particularly to circuits which provide voltage stress indication signals in response to a capacitor's voltage history.

Known capacitor voltage stress systems of the type which indicate whether a predetermined permissible voltage for continuous operation has been exceeded, do not permit the full operational utility of the capacitor to be exploited. This results from the fact that such systems produce overstress indications, and trigger the operation of safety circuitry, only as a function of capacitor voltage. However, it is known that capacitors can withstand substantially higher voltages than their continuous operation voltages for short periods of time. Thus, capacitor failure resulting from voltage stress is a function of voltage and time.

It is, therefore, an object of this invention to provide a circuit for monitoring and indicating the true voltage stress of a capacitor.

It is a further object of this invention to provide a circuit for monitoring the voltage stress of a capacitor with respect to its voltage history.

It is another object of this invention to provide a system for disconnecting a capacitor from a source of electric potential in response to the amplitude and duration of a signal at the capacitor.

SUMMARY OF THE INVENTION

The foregoing and other problems are alleviated by this invention which provides a capacitor voltage stress monitoring circuit which produces an output indication signal in response to the amplitude and duration of the voltage signal at the capacitor. The circuit contains a comparator for producing a signal responsive to the difference between a signal representative of the voltage stress of the capacitor and a predetermined over-voltage value. The difference signal is conducted to a characteristic-curve generator which produces an output signal corresponding to a characteristic-curve. This signal is conducted to an integrator which produces an overload signal. Means are provided for producing a signal corresponding to the difference between the voltage stress signal and a signal which corresponds to a voltage which has been predetermined to be permissible for the continuous operation of the capacitor. Thus, if the capacitor stress voltage is less than the permissible continuous stress voltage, a signal is produced which is conducted to the input of the integrator.

Capacitor voltage stress is monitored in accordance with this invention with respect to voltages which exceed predetermined over-voltage values, and the duration of such voltages. Thus, circuitry for disconnecting a capacitor from a power supply is energized only if a stressful over-voltage condition is present for a time period in excess of a predetermined permissible time interval. In one embodiment of the invention, the voltage stress monitoring circuit contains a plurality of monitoring stages, each of which is designed to monitor a predetermined range of capacitor stress defined by a preselected over-voltage threshold value and a corresponding time interval. Very high over-voltage conditions are detected by circuitry which produces an output signal when an input signal exceeds a predetermined threshold value. The output signal of such a circuit is conducted to a time delay circuit which has a preselected delay response. If an over-voltage signal from the detector circuit persists for a time in excess of the delay response interval of the time delay circuit, the time delay circuit will produce a signal indicative of an impermissible stress situation. Thus, very high over-voltage conditions are sufficient to cause the energization of circuitry for disconnecting the capacitor from the power supply without regard for the over-voltage history of the capacitor.

In one embodiment of the invention, there is further provided circuitry which produces a signal indicative of an impermissible voltage stress situation, which signal is responsive to the over-voltage history of the capacitor. Such history responsive circuitry may be comprised of a plurality of stages, each of which corresponds to a preselected over-voltage threshold. Each such stage contains circuitry for providing a signal responsive to the difference between the voltage across the capacitor and a predetermined threshold value. This signal is conducted to a characteristic-curve generator which produces an output signal if the voltage across the capacitor exceeds the predetermined threshold value. The output signal of the characteristic-curve generator is responsive to the input signal and a predetermined transfer function which has been selected in accordance with the predetermined over-voltage value of the particular monitoring stage. Thus, the slope of a transfer function of a characteristic-curve generator in a monitoring stage which is responsive to relatively low over-voltage conditions is of a lower slope than the transfer function of a characteristic-curve generator which is in a monitoring stage responsive to relatively large over-voltage conditions. The output signal of the characteristic-curve generator is conducted to an input of a second comparator which is connected at its output to an integrator. The integrator has an integration time constant which corresponds to the over-voltage threshold of the monitoring stage in which it is disposed. The integration time constant is longer in integrators which are disposed in monitoring stages responsive to relatively low over-voltage threshold values. There is further provided in the stress monitoring circuit means for producing a reverse integration signal when the capacitor stress voltage is less than the predetermined permissible continuous operation voltage. The reverse integration signal is conducted to an input of the second comparator and is subtractively combined with the output signal of the characteristic-curve generator. The combined signals are conducted to the integrator which produces at its output a signal which corresponds to the present state of the stress of the capacitor, and which takes into consideration the capability of the capacitor to recover from a prior overload condition. In practice, the output signal of the integrator is reduced to a nominal level after an overload condition has been discontinued, by operation of the reverse integration voltage. However, if a subsequent over-voltage condition occurs before the output of the integrator has reached its nominal value, the resulting signal from the characteristic-curve generator will cause the integrator to produce an output signal which rises in amplitude from the level of the integrator output immediately prior to the commencement of the overload condition. Thus, the output of the integrator contains a signal component which corresponds to the history of prior overload conditions.

It is a feature of this invention that the number of monitoring stages can be advantageously adjusted so as to render the voltage stress monitoring circuit responsive to a plurality of over-voltage threshold values. Thus, in situations where fault conditions having predeterminable over-voltage characteristics can be anticipated, the over-voltage threshold and time response parameters may be advantageously preselected to minimize the disconnection of the capacitor from the power supply, while affording adequate stress protection.

It is a further feature of this invention that very high over-voltage conditions are quickly and economically detected.

BRIEF DESCRIPTION OF THE DRAWINGS

Comprehension of the invention is facilitated by reading the following detailed description in conjunction with the annexed drawing which depicts an embodiment of the invention partially in schematic form and partly in block and line representation.

DETAILED DESCRIPTION

The FIGURE shows a circuit for monitoring the stress of a capacitor 1 which forms a portion of a filter with choke 2 and shunt resistor 3. The filter is connected to a transmission line 6 by switching element 38. Transmission line 6 illustratively bears high direct current voltage. The filter circuit is designed to conduct harmonic signal components which are present on transmission line 6 to ground. Such harmonics are illustratively produced by a controlled rectifier 4 which is connected to a three-phase generator 5.

In some embodiments of the invention, the capacitor, which is schematically represented as capacitor 1 in the drawing, may be comprised of a plurality of capacitors which are advantageously connected in series and/or parallel. The voltage stress on capacitor 1 will consist of the direct current voltage on line 6, which will generally be constant, and a superimposed harmonic voltage which may vary over a large range depending upon the operating characteristics of the controlled rectifier 4. Since the direct current voltage stress on capacitor 1 is generally constant, or varied over a relatively narrow range, only the alternating current voltage stress resulting from the harmonic signal components on line 6 is monitored in the present embodiment. For purposes of illustration, the direct current voltage on transmission line 6 may be approximately 500 kV.

The alternating voltage stress across capacitor 1 is detected by the combination of inductive current transformer 7 and integrator 8. Inductive current transformer 7 provides at its output a signal which corresponds to the harmonic components in the current signal flowing through the capacitor. The output signal is conducted to integrator 8 which produces at its output a signal which corresponds to the stress voltage across the capacitor resulting from the harmonic voltages on line 6. The output signal of integrator 8 is conducted to a full-wave rectifier 9 which produces at its output a direct current signal, the amplitude of which corresponds to the amplitude of the harmonic signal voltage component across capacitor 1. The output signal of full-wave rectifier circuit 9 is conducted to a plurality of short term and long term monitoring stages.

In this embodiment of the invention, short term monitoring is achieved by two monitoring stages, each containing a limit indicator and a time delay circuit. A first monitoring stage contains limit indicator 10 which produces at its output a signal which represents that the output of full-wave rectifier 9 exceeds a predetermined level. The output signal of limit indicator 10 is conducted to a time delay circuit 11. Similarly, a second such monitoring stage contains limit indicator 12 and time delay circuit 13. The response threshold of the limit indicators 10 and 12, and the delay responses of respectively connected time delay circuits 11 and 13 are correspondingly different. Illustratively, the response threshold of limit indicator 10 may be preselected so that limit indicator 10 produces an output signal when the output of full-wave rectifier 9 corresponds to a 500 kV over-voltage across capacitor 1. If the threshold limit is exceeded for a time interval greater than the delay response of time delay circuit 11, the delay circuit will produce an output signal to switching control system 14, which is of a known type, and which will cause switching element 38 to disconnect capacitor 1 from transmission line 6. However, if the stress voltage across capacitor 1 falls below the 500 kV threshold voltage corresponding to limit indicator 10 before time delay circuit 11 responds, the time delay circuit will not issue a disconnect signal. Thus, a disconnect signal will issue from this monitoring stage only if the over-voltage threshold value of limit indicator 10 is exceeded for a period greater than the delay response of time delay circuit 11.

The monitoring stage comprising limit indicator 12 and time delay circuit 13 operates similarly to the above-described monitoring stage comprising limit indicator 10 and time delay circuit 11. However, in this embodiment of the invention, limit indicator 12 may have a response threshold which is set to a value which corresponds to an alternating current voltage stress across capacitor 1 of 650 kV. Since capacitor 1 can withstand such a high over-voltage for only a short period of time without damage, the delay response of time delay circuit 13 is selected to be shorter than that of time delay circuit 11. In both of these monitoring stages, disconnect signals are conducted to switching control system 14 if preselected over-voltage thresholds are exceeded for predetermined periods of time without regard for over-voltage history. This is acceptable because such high over-voltage conditions may be without precedent, or occur infrequently.

Long term monitoring of over-voltage conditions is accomplished by a plurality of monitoring stages, each of which comprises a potentiometer which has been set to correspond to a predetermined over-voltage threshold value, a comparator for comparing the alternating current voltage stress signals to the predetermined threshold value, a characteristic-curve generator for approximating the response of the capacitor to over-voltage conditions, a second comparator for comparing an output signal of the characteristic-curve generator with a signal which is responsive to a permissible continuous operation threshold value, and an integrator. In the FIGURE, one such monitoring stage contains potentiometer 14, comparator 16, characteristic-curve generator 17, second comparator 18 and integrator 19. This embodiment of the invention contains second and third such monitoring stages, which monitoring stages respectively contain circuit elements identified as 20–24, and 25 to 29. Comparators 16, 21 and 26 compare the output signal from full-wave rectifier 9, which corresponds to the alternating current voltage stress, to predetermined voltage threshold values which are set at potentiometers 15, 20 and 25, respectively. For purposes of illustration, the voltage threshold set at potentiometer 15 may be 350 kV. The voltage threshold set at potentiometers 20 and 25, may be 150 kV and 16 kV, respectively. Characteristic-curve generators 17, 22 and 27 are similarly constructed but have different transfer function characteristics. Illustratively, characteristic-curve generator 17 may have a transfer function having a high slope; characteristic-curve generator 22 may have a transfer function with a more moderate slope; and characteristic-curve generator 27 may have a transfer function with a relatively low slope. The circuit components contained in the characteristic-curve generators are known to persons of skill in the art.

During the time that the output of full-wave rectifier 9 corresponds to an alternating current voltage stress across capacitor 1 which exceeds 16 kV, comparator 26 will conduct a signal to characteristic-curve generator 27, signifying that the 16 kV threshold value which was preset in potentiometer 25 has been exceeded. Characteristic-curve generator 27 will produce an output signal which is conducted to integrator 29. Integrator 29 has an integration time constant which has been preselected to be relatively large. If the output signal of full-wave rectifier 9 corresponds to an alternating stress voltage which exceeds 150 kV, comparator 21 will conduct a signal to characteristic-curve generator 22, which signifies that the capacitor alternating voltage stress exceeds the 150 kV threshold value set at potentiometer 20. Characteristic-curve generator 22 will provide at its output a signal which is conducted to integrator 24. Integrator 24 has an integration time constant which is shorter than that of integrator 29. Finally, if the capacitor stress voltage exceeds 350 kV, comparator 16 will provide a signal to characteristic-curve generator 17, which will consequently conduct a signal to integrator 19. The integration time constant of integrator 19 is shorter than that of integrator 24.

If an over-voltage condition at capacitor 1 exceeds any of the response thresholds which are preset in potentiometers 15, 20 and 25, and if such an over-voltage condition is discontinued within the respective permissible time to less than the predetermined permissible continuous stress threshold, the output signals of integrators 19, 20 and 29 will revert to their lower limit. This results from the presence of a reverse integration voltage which is conducted to each of second comparators 18, 23 and 28. The reverse integration signal is produced by the combination of a low-pass filter 33, a potentiometer 34, a comparator 35, a comparator 36 and a potentiometer 37. In this embodiment of the invention, the alternating current voltage stress signal at the output of full-wave rectifier 9 is conducted through low-pass filter 33 for supressing preselected harmonics. The output signal of low-pass filter 33 is compared to a permissible continuous over-voltage threshold which has been set at potentiometer 34, by operation of comparator 35. In this embodiment of the invention, potentiometer 34 is adjusted so as to establish a permissible continuous operation voltage for the capacitor of 16 kV. The output signal of comparator 35 is conducted to comparator 36, the response threshold of which is set to zero volts. Thus, if the alternating current stress voltage of the capacitor exceeds the continuously permissible value, the comparator 36 output signal will be zero. On the other hand, if the alternating current voltage stress of the capacitor falls below the continuously permissible value, comparator 36 will conduct, via potentiometer 37, a reverse integration output signal to comparators 18, 23 and 28. The reverse integration signal is subtractively combined in comparators 18, 23 and 28 with the respective output signal from characteristic-curve generators 17, 22 and 27. Potentiometer 37 is advantageously adjustable to determine the time constant of the reverse integration of integrators 19, 24 and 29. If a new over-voltage condition occurs during the period that the integrators are performing a reverse integration so as to return to their respective lower limits, the forward integration resulting from the output signals of characteristic-curve generators 17, 22 and 27, will cause the output signal of the integrators 19, 24 or 29, to rise from the level at which they were when the new over-voltage condition occurred. The output voltage of integrators 19, 24 and 29 is therefore a measure of the present over-voltage state of capacitor 1, which takes into consideration previous over-voltage stresses. The output signals of integrators 19, 24 and 29 are conducted to an adder 30. The output signal of adder 30 represents the present over-voltage state of the capacitor, and is conducted to limit indicators 31 and 32. The response threshold of limit indicator 31 is preselected so as to provide a warning signal if the permissible continuous stress of capacitor 1 is exceeded, but the overload does not last longer than is permissible. Thus, although the output signal of limit indicator 31 is conducted to switching control system 14, it will not cause switching element 38 to disconnect the capacitor from the line. The response threshold of limit indicator 32 is set to a value which corresponds to an overload condition of the capacitor which persists for an unacceptable period of time. The output signal of limit indicator 32 causes capacitor 1 to be disconnected from transmission line 6.

The voltage stress monitoring circuit described hereinabove can be used to monitor the voltage stresses of capacitors in single phase and multiphase transmission systems. In multiphase transmission systems which use a capacitor in a filter arrangement for each such phase, the stress monitoring circuit is replicated for each such phase. In such embodiments of the invention, the voltage stress monitoring circuit monitors the entire stress of the capacitor, including stress caused by the fundamental frequency component of the transmission line signal and the superimposed harmonic frequency components. Accordingly, potentiometers 15, 20, 25 and 34 would be set to produce output voltages corresponding to other threshold values.

Although the inventive concept disclosed herein has been described in terms of specific embodiments and applications, other applications and embodiments will be obvious to persons skilled in the pertinent art without departing from the scope of the invention. Such skilled persons can, in view of this teaching, conform the values of circuit components and parameters so as to operate the invention within the context of direct current, single phase, and multiphase transmission systems. The drawings and descriptions of specific embodiments of the invention in this disclosure are illustrative of applications of the invention and should not be construed to limit the scope thereof.

What is claimed is:

1. A circuit for monitoring the voltage stress of a capacitor CHARACTERIZED IN THAT there are provided
   a. means for producing a first signal representative of the voltage stress of the capacitor, b. comparison means for comparing said first signal with a predetermined over-voltage value, c. characteristic-curve generator means having a predetermined transfer function and connected to said comparison means for producing a second signal responsive to said first signal and said transfer function when said first signal exceeds said predetermined over-voltage value, d. integration means having a predetermined integration time constant and connected to said characteristic-curve generator means for integrating said second signal and producing an overload signal, and e. continuous value means for producing a reverse integration signal which is responsive to a predetermined permissible continuous capacitor stress value and which is conducted to said integration means for adjusting the level of said overload signal.

2. The circuit of claim 1 in which the capacitor voltage stress is monitored in n over-voltage ranges, the circuit further comprising a. $n-1$ comparison means for comparing said first signal with $n-1$ predetermined over-voltage values, b. $n-1$ characteristic-curve generator means, each having different predetermined transfer functions, and connected to respective ones of $n-1$ comparison means for producing $n-1$ second signals each responsive to said first signal and an associated one of said transfer functions when said first signal exceeds an associated one of said predetermined over-voltage values, c. $n-1$ integration means each having a respective predetermined integration time constant, and connected to a respective one of said $n-1$ characteristic-curve generator means for integrating a respective one of said $n-1$ second signals and producing a respective overload signal, and d. adder means connected to each of said $n-1$ integration means for producing a combined overload signal.

3. The circuit of claim 1 in which there is further provided a short term monitoring stage comprising a. limiter means having a predetermined threshold response value, having an input terminal for receiving said first signal and an output terminal for providing an over-voltage indication signal when said first signal exceeds said predetermined threshold response value, and b. time delay means having predetermined delay response interval and connected to said output terminal of said limiter means for producing at an output terminal an over-stress indicator signal when said over-voltage condition signal persists for a time period in excess of said predetermined delay response interval.

4. The circuit of claim 1 in which said means for producing a first signal comprises a. an induction current transformer disposed about a lead of the capacitor, b. integrator means connected to said induction current transformer and having an output terminal for producing a signal corresponding to the voltage across the capacitor, and c. rectifier means connected to said integrator means and having an output terminal for providing a direct current signal which corresponds in amplitude to the voltage stress of the capacitor.

* * * * *